United States Patent [19]

Hayashi et al.

[11] Patent Number: 4,805,001

[45] Date of Patent: Feb. 14, 1989

[54] MAGNIFICATION CONVERTING MECHANISM FOR A VARIABLE MAGNIFICATION COPYING APPARATUS

[75] Inventors: Tatsushi Hayashi, Nara; Shoichiro Yoshiura, Yamatokoriyama; Ken-ichi Iwamoto, Nara, all of Japan

[73] Assignee: Sharp Kabushiki Kaisha, Osaka, Japan

[21] Appl. No.: 104,049

[22] Filed: Oct. 2, 1987

[30] Foreign Application Priority Data

| | | | |
|---|---|---|---|
| Oct. 2, 1986 | [JP] | Japan | 61-235346 |
| Oct. 3, 1986 | [JP] | Japan | 61-236711 |
| Oct. 3, 1986 | [JP] | Japan | 61-236712 |

[51] Int. Cl.[4] ........................ G03B 27/36; G03B 27/38

[52] U.S. Cl. ........................ 355/58

[58] Field of Search .................. 355/3 R, 14 R, 55–59

[56] References Cited

U.S. PATENT DOCUMENTS

| | | | |
|---|---|---|---|
| 4,453,824 | 6/1984 | Miyake et al. | 355/57 |
| 4,571,064 | 2/1986 | Hayashi et al. | 355/57 |
| 4,641,957 | 2/1987 | Takeda et al. | 355/58 |
| 4,733,278 | 3/1988 | Negoro | 355/58 |

*Primary Examiner*—Richard A. Wintercorn

*Attorney, Agent, or Firm*—Birch, Stewart, Kolasch & Birch

[57] ABSTRACT

A magnification converting mechanism for a variable magnification copying apparatus, which includes a magnification converting lever provided on a control panel, a magnification change-over arm associated with functioning of the magnification converting lever, a lens holder slidably fitted on a sliding shaft and engaged with part of the magnification change-over arm so as to be slid over the sliding shaft following displacement of the arm, and a lens assembly held on the lens holder.

7 Claims, 10 Drawing Sheets

MAGNIFICATION CONVERTING MECHANISM FOR A VARIABLE MAGNIFICATION COPYING APPARATUS

BACKGROUND OF THE INVENTION

The present invention generally relates to a copying apparatus, and more particularly, to a magnification converting mechanism for a variable magnification copying apparatus capable of effecting magnification conversion through manual alteration of lens positions without employing a driving source such as a motor, etc. In the variable magnification copying apparatus of the present invention, there is further provided a lens position warning device which emits warning when the lens position is not properly set.

Conventionally, in a variable magnification copying apparatus, a motor is employed for effecting the magnification conversion. More specifically, it is so arranged that the lens position is altered by the motor so as to effect the conversion of magnifications.

However, in the known variable magnification copying apparatus as referred to above, sensors or the like are also required for detecting displacement of the lens assembly besides the employment of the motor, thus resulting in a large size of the copying apparatus on the whole, and also inviting cost increase due to employment of expensive parts.

SUMMARY OF THE INVENTION

Accordingly, an essential object of the present invention is to provide an improved magnification converting mechanism for a variable magnification copying apparatus which is so arranged as to be capable of manually altering lens positions without employment of a motor or the like, and readily coping with the situation even when kinds of copy paper sheets (e.g. AB system and inch system, etc.) are changed.

Another object of the present invention is to provide a magnification converting mechanism of the above described type, which is compact in size and simple in construction, and can be readily incorporated into the copying apparatus of this kind at a low cost.

A further object of the present invention is to provide a lens position warning device for a variable magnification copying apparatus of the above described type, which gives warning to an operator when the lens position is not correct.

In accomplishing these and other objects, according to one aspect of the present invention, there is provided a magnification converting mechanism for a variable magnification copying apparatus, which includes a magnification converting lever provided on a control pane; a magnification change-over arm associated with the functioning of the magnification converting level; a lens holder slidably fitted on a sliding shaft and engaged with part of the magnification change-over arm so as to be slid over the sliding shaft following displacement of the arm; and a lens assembly held on the lens holder.

In the magnification converting mechanism of the present invention as described above, when the magnification converting lever provided on the control panel is operated, the magnification change-over arm is actuated in association with the functioning of the lever, and the lens holder is slid over the sliding shaft according to the functioning of the magnification change-over arm. More specifically, the lens holder slides over the sliding shaft by a length corresponding to the amount of displacement of the magnification converting lever. By this arrangement, it is possible to displace the lens assembly held on the lens holder to the predetermined position by only operating the magnification converting level without employment of a motor or the like.

In another aspect of the present invention, there is provided a magnification converting mechanism for a variable magnification copying apparatus, which includes a magnification converting lever provided on a control panel, a magnification change-over arm associated with functioning of the magnification converting lever, a lens holder slidably fitted on a sliding shaft and engaged with part of the magnification change-over arm so as to be slid over the sliding shaft following displacement of the arm, a lens assembly held on the lens holder, a lens displacement restricting pin provided on the lens holder, and a lens position restricting plate provided in a parallel relation with the sliding shaft and formed with recesses into which the lens displacement restricting pin is fitted when the lens holder is in a predetermined position. The plate is characterized in that the recesses of the lens position restricting plate are formed at opposite sides of the restricting plate with the position of the recess at one side and that at the other side being different along the direction of displacement of the lens holder, and the restricting plate is so mounted that either of the recesses at the opposite sides thereof can confront the lens displacement restricting pin.

Accordingly, in the above magnification converting mechanism of the present invention, upon operation of the magnification converting lever, the lens holder which holds the lens assembly is displaced along the sliding shaft in association with the amount of operation of the magnification converting lever. Accordingly, the operator can set the lens assembly at the predetermined position only through operation of the magnification converting lever without employment of a motor and the like.

Moreover, since the lens position restricting plate is formed with the recesses in which the lens displacement restricting pin provided on the lens holder is fitted, the operator can feel a click on the magnification converting lever upon fitting of the lens displacement restricting pin in the recess of the lens position restricting plate. Therefore, by setting the positions of the recesses formed in the lens position restricting plate to correspond to the size of the copy paper sheets (e.g. A4 size, B5 size, etc.), the operator can set the lens assembly at the correct position by stopping the magnification converting lever at the position where the click is felt.

Furthermore, owing to the construction that the recesses of the lens position restricting plate are formed at the opposite sides of said restricting plate, with the recess at one side and that at the other side being formed at different positions, if the positions of the recesses are adapted to correspond to the kinds of copy paper sheets (e.g. AB system, inch system, etc.), either kind of the copy paper sheet may be dealt with by merely altering the direction of mounting of the lens position restricting plate.

In a further aspect of the present invention, there is also provided a magnification converting mechanism for a variable magnification copying apparatus, which includes a magnification converting lever provided on a control panel, a magnification change-over arm associated with functioning of the magnification converting lever, a lens holder slidably fitted on a sliding shaft and engaged with part of the magnification change-over arm so as to be slid over the sliding shaft following displacement of the arm, a lens assembly held on the lens holder, a lens displacement restricting pin provided on the lens holder, and a lens position restricting plate provided in a parallel relation with the sliding shaft and formed with recesses into which the lens displacement restricting pin is fitted when the lens holder is in a predetermined position. It is also characterized in that there is further provided a lens position warning device comprising a switch means which is actuated when the displacement restricting pin is fitted into the recess, and means for giving warning when the switch means is not functioning.

In the above arrangement of the present invention, by the operation of the magnification converting lever, the magnification change-over arm is actuated, and further the lens holder slides over the sliding shaft. In other words, the lens position may be altered through operation of the magnification converting lever. In this case, since the lens displacement restricting pin is fitted into the recess of the lens position restricting plate when the lens holder has been displaced by the predetermined amount, the operator can feel the click in the operation of the magnification converting lever at the position where the pin engages the recess. Accordingly, if the lever is stopped when the click is felt, the lens assembly may be set at the position of magnification corresponding to the recess of the lens position restricting plate.

Normally, the lens assembly may be set at the correct position by the above function, but if the magnification converting lever is not operated to the correct position, the lens position restricting pin is not fitted in the recess and thus, the switch means provided in the recess is not actuated. In this case, the non-actuation of the switch means is detected for warning to the operator. Accordingly, if the warning is not given upon operation of the magnification converting lever, the operator can recognize that the lens assembly has been set at the correct position, while, if the warning is given, he can find that the lens assembly has not been set at the correct position. Thus, the operator may readily find whether or not the lens position is correct only by the presence or absence of the warning.

BRIEF DESCRIPTION OF THE DRAWINGS

These and other objects and features of the present invention will become apparent from the following description taken in conjunction with the preferred embodiment thereof with reference to the accompanying drawings, and in which.

DESCRIPTION OF THE PREFERRED EMBODIMENTS

Figure 1:
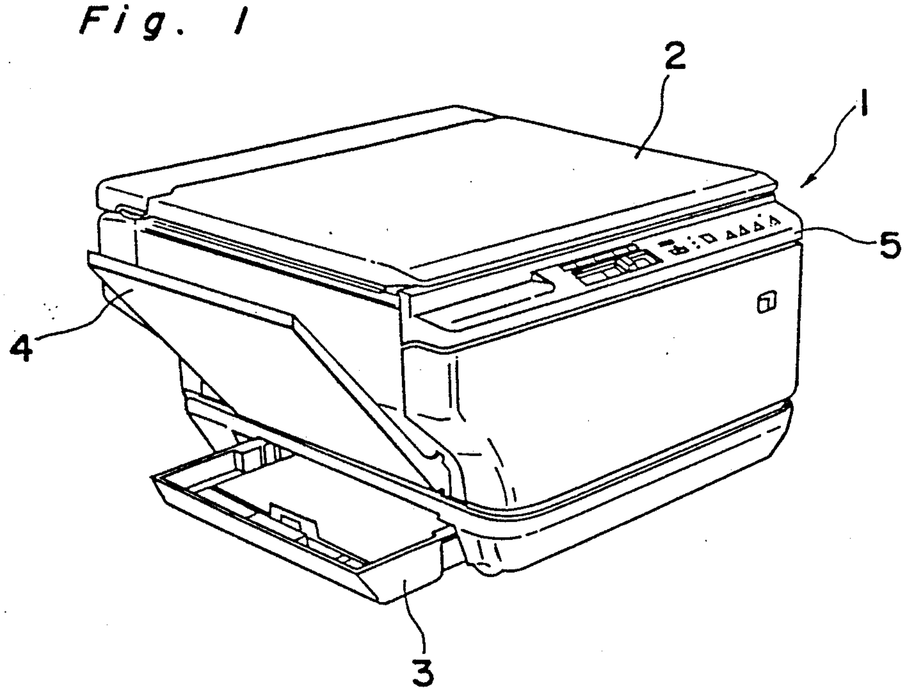
FIG. 1 is a perspective view showing an external appearance of an electrophotographic copying machine to which the present invention may be applied.

Before the description of the present invention proceeds, it is to be noted that like parts are designated by like reference numerals throughout the accompanying drawings.

The drawings show a variable magnification copying apparatus provided with a magnification converting mechanism according to one preferred embodiment of the present invention.

The embodiment of the present invention is described in the following order.

1. External appearance (refer to FIG. 1)
2. Entire construction (refer to FIG. 2)
3. Control panel (refer to FIG. 3)
4. Lens unit (refer to FIGS. 4 and 5)
5. Blank lamp unit (refer to FIG. 6)
6. Optical system cleaning construction (refer to FIGS. 7 through 9)
7. Exhaust construction (refer to FIGS. 10 and 11)
8. Lens position warning display (refer to FIG. 12)

1. External appearance of a variable magnification copying machine

FIG. 1 is an external view showing an electrophotographic copying machine according to the embodiment of the present invention. An original document cover 2 is pivotally supported at its rear end on the top surface of a copying machine 1 so as to be raised or lowered for opening or closing. A paper supplying cassette 3 is mounted on the copying machine 1 at the bottom thereof. The paper supplying cassette 3 can be selectively attached to the copying machine 1 depending on the size of paper to be housed therein. A paper discharge tray 4 is mounted at the left side of the copying machine 1. A sheet of paper supplied from the paper supplying cassette 3 passes through the copying unit in the copying machine 1, and thereafter, is transported to the paper discharge tray 4 after it passes through the paper discharge unit not shown in the drawing. A control panel 5 is installed on the front of the top surface of the copying machine 1. A print switch, magnification setting lever, and the like are mounted on the control panel 5. The detailed description of the control panel 5 is given later.

2. Entire construction

Figure 2:
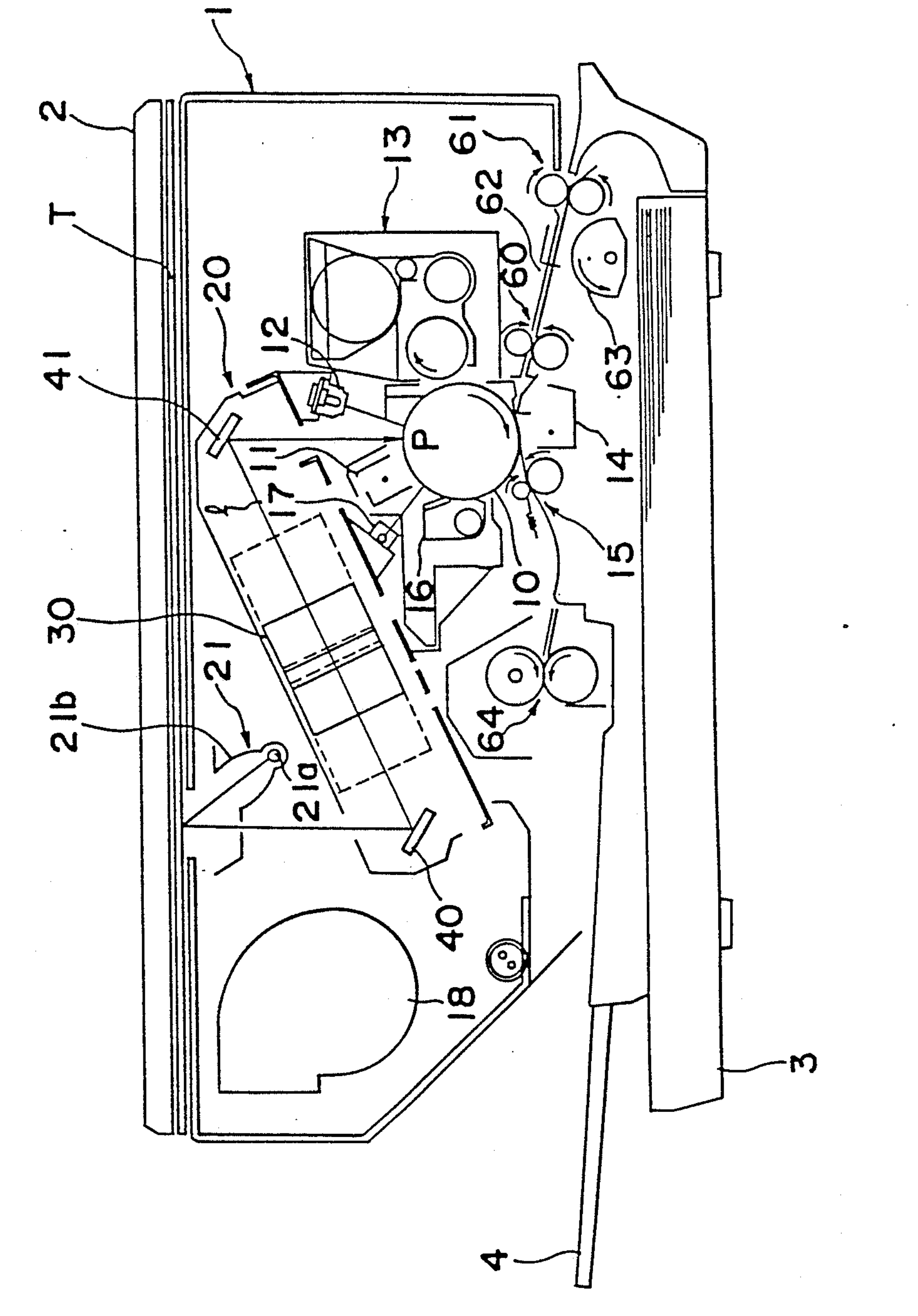
FIG. 2 is a schematic side sectional view showing general construction of the copying machine of FIG. 1.

FIG. 2 is a view showing the entire construction of the copying machine.

The copying machine generally includes a photosensitive or photoreceptor drum 10 having a photosensitive surface on its peripheral surface and rotatably mounted at approximately the central portion of the copying machine 1 so as to be driven for rotation in the direction indicated by an arrow. Also included are various processing stations such as a main corona charger 11, a blank lamp unit 12, a developing unit 13, an image transfer charger 14, a set of paper separating rollers 15, a cleaner unit 16, and a deelectrifying or charge erasing lamp 17 which are sequentially disposed around the photosensitive surface of said photoreceptor drum 10 as illustrated. A symbol P shown at an upper portion of the photosensitive drum 10 indicates the exposure point on which a light transmitted from the optical system is incident.

An optical system provided at an upper portion of the copying machine 1 comprises a lens unit 20 and a light source unit 21. The lens unit 20 is movable along the optical axis. The lens unit 20 includes a lens 30 and two reflecting mirrors 40, 41. The lens 30 is movable along as well as perpendicular (direction perpendicular to the drawing) to the optical axis l. The lens unit 20 is composed of a side plate, a lens unit cover which covers the upper portion of the side plate, and a lens unit base positioned at the bottom of the side plate. The lens unit cover is capable of sliding so as to be opened and closed. The detailed description of the lens unit cover is made later. An air flow opening (air suction opening) is provided at the lens unit base.

The light source unit 21 includes a light source 21*a* and a reflector 21*b*. Since an original document platform T disposed at the upper portion of the copying machine 1 of the embodiment is movable, the light source unit 21 and the lens unit 20 are fixed to the copying machine 1.

A unit composed by integrating the photosensitive drum 10, main charger 11, and cleaner unit 16 is detachable from the copying machine 1. The developing unit 13 is also detachable therefrom. Therefore, the above-described two units are replaced as necessary.

Two sets of paper transport rollers 60, 61 and a paper transport passage 62 are mounted at the lower right portion of the photosensitive drum 10. A semicircular paper supplying roller 63 is mounted thereunder. Through rotation of the paper supplying roller 63, a sheet of paper disposed uppermost on the stacks of paper housed in the paper supplying cassette 3 is supplied to the copying machine 1, and thereafter, transported to the copying unit through the paper transport rollers 61, 60, and the paper transport passage 62. Fixing rollers 64 are mounted at the left side of the photosensitive drum 10. A toner image is transferred onto a sheet of paper by the copying unit. The transferred toner image is fixed to the paper by the fixing rollers 64. Thereafter, the paper is transported to the paper discharge tray 4. The fixing rollers 64 according to this embodiment serve as paper discharge rollers. Numeral 18 denotes an exhaust fan.

According to the above-described construction, when an original document is placed on the original document platform T and a print switch is operated, the original document platform T reciprocates and the light source unit 21 is actuated, whereby the image of the original document is scanned by the light source unit 21. A light which has been reflected from the original document passes through the lens unit 20, and thereafter, is incident upon the exposure point P, of the photosensitive drum 10, at which an electrostatic latent image is formed. The electrostatic latent image which has been formed on the surface of the photosensitive drum 10 by the developing unit 13 is developed into a visible image by the developing unit 13. The image which has been thus developed is transferred onto a sheet of paper transported from the paper supplying cassette 3 by the image transfer charger 14. Thereafter, the image on the paper is fixed by the fixing rollers 64, and then, the paper is discharged into the paper discharge tray 4. Toner particles which have remained on the photosensitive drum 10 are removed therefrom by the cleaner unit 16. Residual electric charge on the photosensitive drum 10 is erased by the charge erasing lamp 17, whereby the following copying operations are carried out.

3. Control panel

Figure 3:
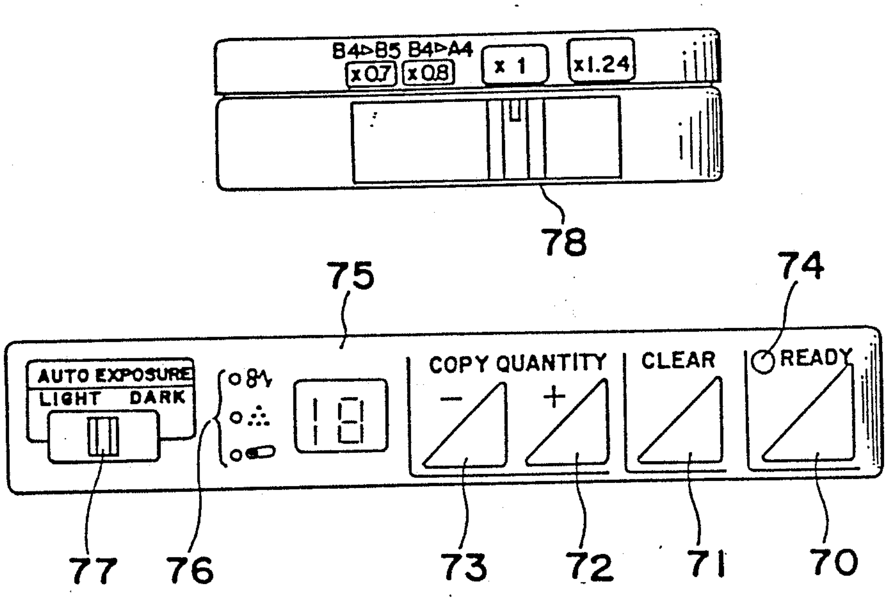
FIG. 3 is a top plan view showing an arrangement on a control panel of the copying machine of FIG. 1.

FIG. 3 shows the construction of the control panel. Numeral 70 denotes the print switch (print key). Numeral 71 denotes a clear key to clear the number set previously. Numerals 72 and 73 denote keys to set the number of copying sheets. Numeral 74 denotes a ready lamp to indicate that the copying machine 1 is ready to carry out a copying. Numeral 75 denotes an indicator. Numeral 76 denotes a warning display lamp. Numeral 77 denotes a switch (key) to set an exposure mode. Numeral 78 denotes a magnification converting lever.

The warning display lamp 76 indicates a paper jamming and toner shortage. The exposure mode setting switch 77 sets an exposure mode to standard, dark or light in carrying out an automatic exposure. The magnification converting lever 78 selects a magnification from among the four magnifications.

4. Lens unit

The magnification converting mechanism which is one of the characteristic features of the present invention is described hereinafter.

Figure 4:
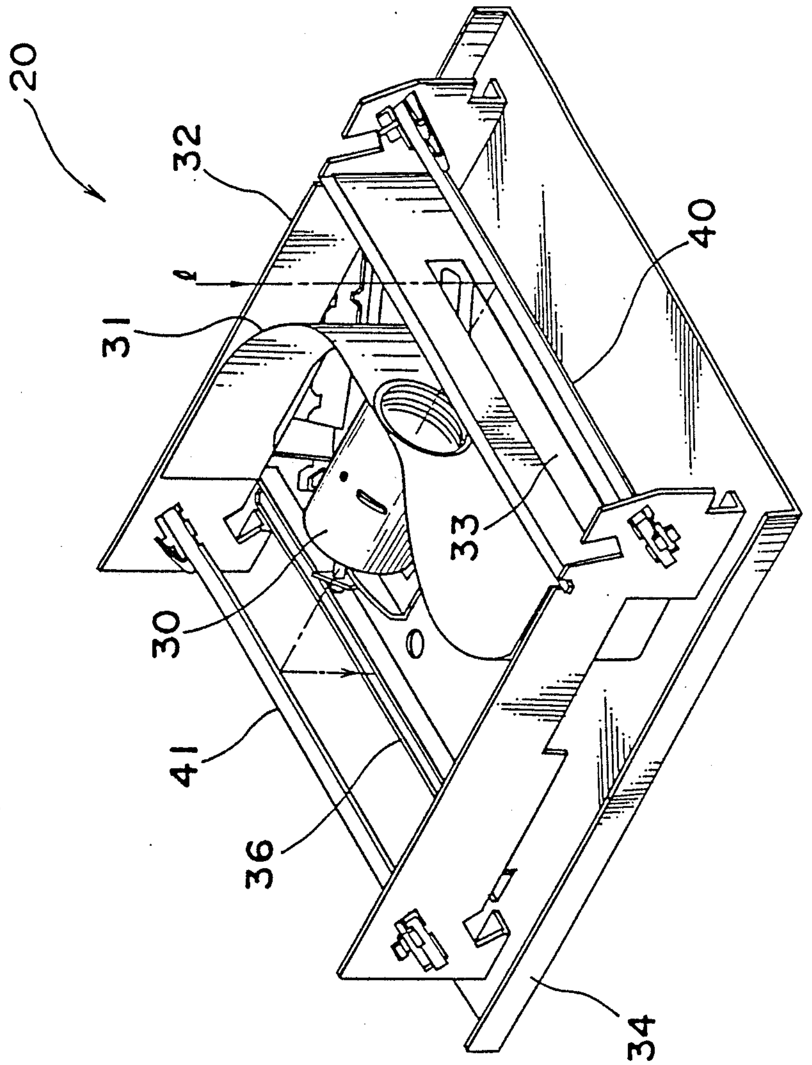
FIG. 4 is a perspective view showing construction of a lens unit employed in the copying machine of FIG. 1, FIGS. 5(A) and 5(B) are top plan views of a lens unit displacing mechanism for explaining the state of functioning thereof.

FIG. 4 is a perspective view of an external appearance of the lens unit 20.

The lens unit displacement mechanism whose detail is described later permits the lens assembly 30 to move to a predetermined position in the lens unit 20. A flexible light shielding sheet 31 is provided to extend to opposite sides of the lens assembly 30 inside the lens unit main body 32. The sheet 31 serves as a means for shielding light (stray light) which does not pass through the lens assembly 30. Both ends of the sheet 31 are in contact with the internal walls of the lens unit 32. The configuration of the sheet 31 is an inverted letter "S". A first slit 33 is provided between the lens 30 and a first reflection mirror 40. A second slit 36 is provided at a portion which confronts a second reflection mirror 41 mounted on a lens unit base 34.

A light which has been reflected from an original document is reflected by the first mirror 40, and thereafter, is incident upon the lens 30 after the light passes through the first slit 33. The light which has passed through the lens assembly 30 is reflected downwards by the first mirror 40, and then, incident upon the exposure point P shown in FIG. 1 after it passes through the second slit 36 provided on the lens unit base 34.

Lens unit displacement mechanism

The lens unit displacement mechanism is mounted on the lens unit base 34 shown in FIG. 4. This mechanism controls the position of the lens assembly 30 in unison with the operation of a magnification converting lever 78 as shown in FIG. 3.

Figure 5A:
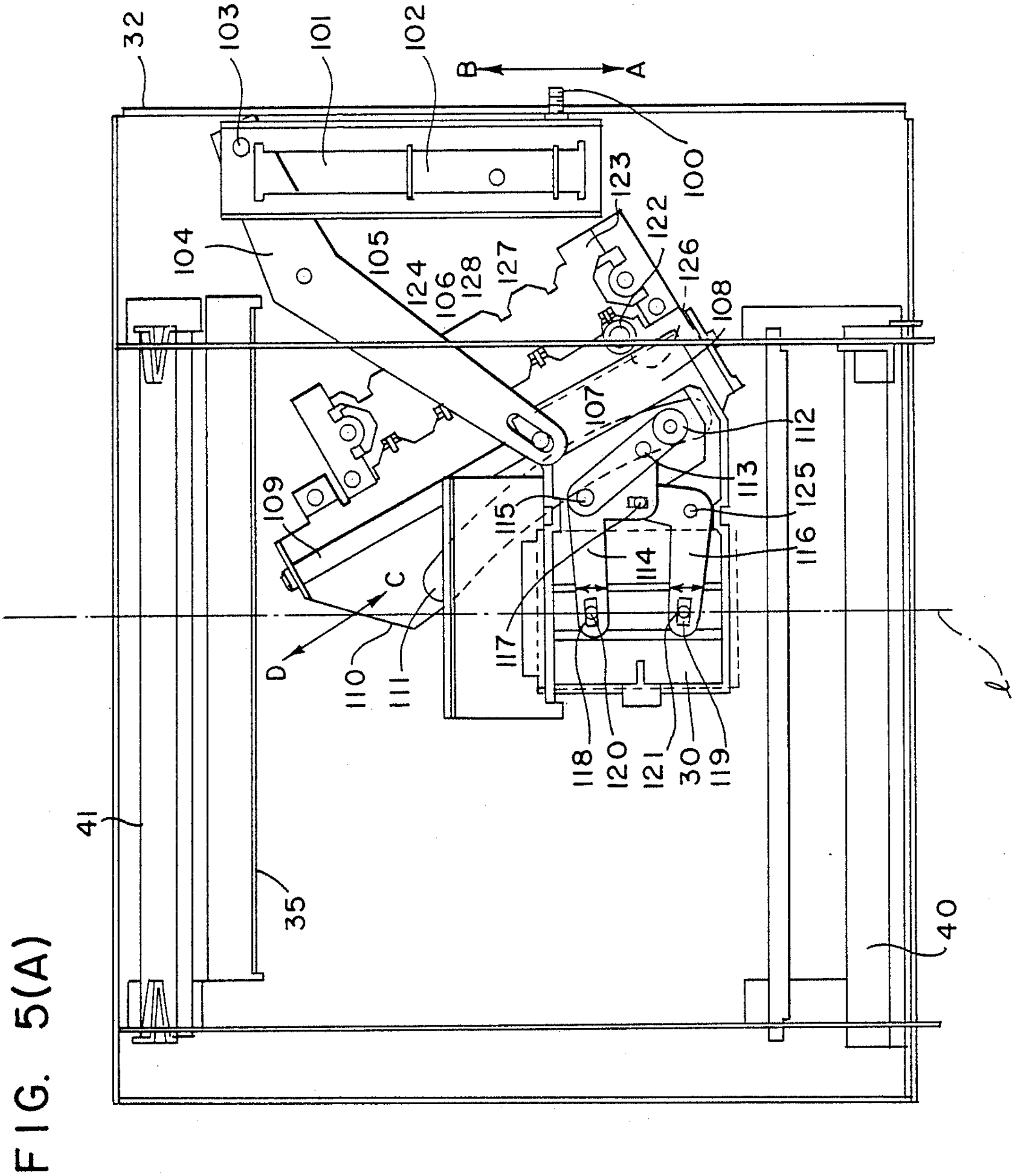

FIG. 5(A) is a view showing the lens unit displacement mechanism.

A lens unit moving lever 100 (hereinafter referred to as a moving lever 100) is linked to the magnification converting lever 78 through the link mechanism not illustrated in the drawing, i.e., both levers are linked to each other by connecting one lever to one end of the link mechanism and the other to the other end thereof so that both levers may move in the same direction. The moving lever 100 is capable of moving in the directions A and B as shown by the arrow. The moving lever 100 is fixed to a sliding lever 101 mounted on the side plate of the lens unit main body 32. The sliding lever 101 is supported by a sliding lever supporting member 102 to be slidable in the directions A and B shown by the arrow. One end of a magnification change-over arm 104 generally in an inverted V-shape is pivotally supported at the upper portion of the sliding lever 101 by a pin 103. The magnification change-over arm 104 is supported by a pin 105 at approximately the intermediate portion thereof so as to be rotatable about the pin 105. An elongated opening 106 is formed on one end of the magnification change-over arm 104. A pin 107 is fitted in the elongated opening 106. The pin 107 is mounted on a lens holder 108 which holds the lens assembly 30 such that the pin 107 projects upwards from and perpendicular to the drawing. The lens holder 108 is slidable along a sliding shaft 109. Both ends of the sliding shaft 109 are fixed to a support plate 110. The support plate 110 is fixed to the lens unit base 34 with a certain angle formed relative to the base 34. A slightly curved elongated guide groove 111 is mounted on the left side of the supporting plate 111. A roller-shaped member 112 is fitted in the guide groove 111 so as to be guided thereby. The member 112 is mounted on one end of an arm 113. An inverted L-shaped first lens displacement member 114 is rotatably connected to one end of an arm 113 by a pin 115. A second lens displacement member 116 in the shape of an inverted L is connected to the first lens displacement member 114 by a pin 117 in symmetrical relationship with the first lens moving member 114. Elongated openings 118 and 119 are formed at the ends of the first and second lens displacement members 114 and 116, respectively. Pins 120 and 121 projected perpendicular to and upwards from the lens assembly 30 (drawing) are fitted in the elongated openings 118 and 119.

The lens assembly 30 comprises a compound lens and a casing. The pins 120 and 121 are movable in the directions A and B shown by the arrow. The pins 120 and 121 are fixed to a predetermined lens unit of the compound lens mounted in the casing, respectively. With the movements of the pins 120 and 121, the lens unit to which the pins are fixed move, whereby the focal length of the lens assembly 30 is changed, i.e., the magnification thereof can be converted. The lenses of such a construction are widely used in variable magnification copying machines. Therefore, its description is omitted herein.

A lens displacement restricting pin 122 is mounted, through a leaf spring 126, at a position opposite to the lens assembly 30 held by the lens holder 108. A lens displacement restricting plate 123 is mounted at the right of and parallel to the sliding shaft 109. Four recesses 127 are formed on the lens position restricting plate 123 at the left side thereof. Detection switches 124 are disposed in the respective recesses 127. Four similar recesses 128 are also formed in the lens position restricting late 123 at the right side thereof. The detailed description of the lens position restricting plate 123 is given later. The four recesses provided at the right side are used for paper sheets in the inch system, which will be described later.

When the lens displacement restricting pin 122 fitted in the recess 127 depresses the detection switch 124, the switch is turned on, and the ON signal is inputted to a microcomputer mounted on the control unit, whereby it is detected that the lens holder 108 is at a predetermined position. The four recesses 127 determine the lens assembly 30 position which corresponds to a magnification set by the magnification converting lever 78. Specifically the lowermost restricting plate 123 corresponds to the magnification of $\times 1.24$. The recess directly above the lowermost one corresponds to the magnification of $\times 1$ (life size or equal size magnification). The recess positioned above the second lowermost recess corresponds to the magnification of $\times 0.8$. The uppermost recess corresponds to the magnification of $\times 0.7$. The lens holder 108 slides along the sliding shaft 109, with the result that the lens displacement restricting pin 122 fixed to the lens holder 108 engages with one of the recesses, whereby the position of the lens assembly 30 is determined.

Figure 5B:
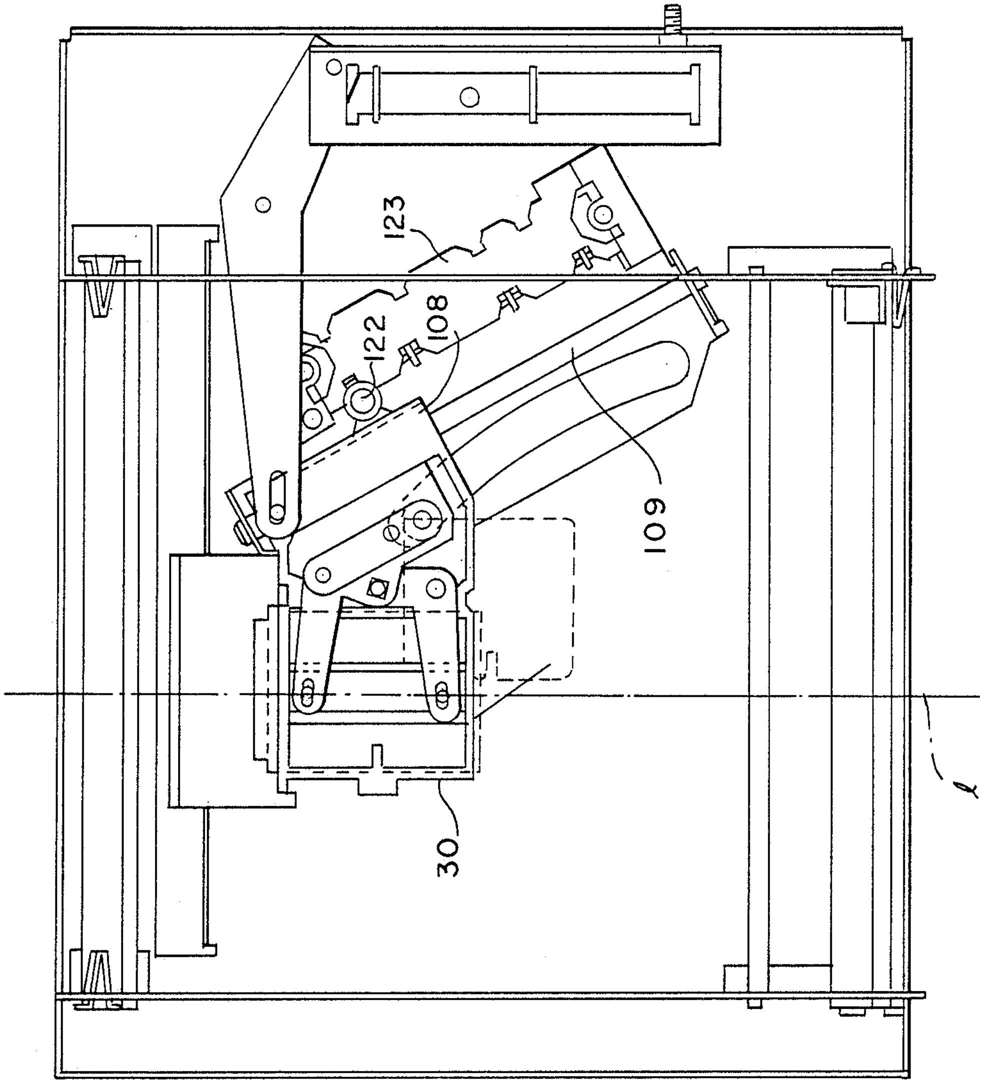

In FIG. 5(B), the lens displacement restricting pin 122 engages with the uppermost recess formed on the lens position restricting plate 123 with the upward movement of the lens holder 108 along the sliding shaft 109. The movement of the lens holder 108 from the position shown in FIG. 5(A) to the position shown in FIG. 5(B) causes the lens assembly 30 to move to an upper right position. The lens assembly 30 moves parallel to the sliding shaft 109, i.e., the lens assembly 30 moves with a certain angle formed with respect to the optical axis l. This is because an original document is placed on one side of the original document platform. In detail, when the original document is placed in this manner, the center line of the original document shifts depending on the size thereof. For example, the center line of an original document in size B5 shifts from that of an original document in size A4, i.e., the position of the optical axis l is altered depending on the size of an original document.

The detection switches 124 disposed in the respective recesses 127 serve as a means for detecting whether or not the lens displacement restricting pin 122 has engaged with a predetermined recess. If the detection switch 124 is not turned on, the indicator 75 mounted on the control panel 5 makes an error indication, which will be described later. The detection switch 124 enables an operator to check whether or not the lens assembly 30 is placed at the position which corresponds to the magnification set by the magnification converting lever 78.

Operation of lens unit displacement mechanism

When the lens displacing lever 100 moves from the position shown in FIG. 5(A) to the direction A shown by the arrow, the magnification converting lever 78 is below the position of the magnification of $\times 1.24$. When the magnification converting lever 78 is shifted from the position below the magnification of $\times 1.24$ to the left on the control panel, the lens displacing lever 100 moves in the direction A shown by the arrow. With the movement of the lens displacement lever 100 in the direction A, the sliding lever 101 moves in the direction A shown by the arrow. At this moment, the magnification change-over arm 104 rotates clockwise about the pin 105. This causes the lens holder 108 to move in the direction D shown by the arrow along the sliding shaft 109, which in turn, causes the lens assembly 30 to move in the direction D shown by the arrow. At this point, the member 112 is guided along the guide groove 111 and the arm 113 rotates clockwise to a small extent on the whole. This causes the first lens displacing member 114 to rotate clockwise to a small extent about the pin 115. The torque generated by this rotation is transmitted to the second lens displacing member 116 through the pin 117, which in turn causes the second lens moving member 116 to rotate to a small extent about the pin 125, with the result that the pins 120 and 121 move in the direction B and A to a small degree respectively, and that the lenses of the lens assembly 30 in which the pins 120 and 121 are mounted move inside the lens assembly 30 in the directions B and A respectively. The movements of the lenses in the lens assembly 30 adjust the focal lengths thereof.

According to the above-described operation, the lens assembly 30 moves to a predetermined position. The magnification converting lever 78 clicks when it is shifted to the position of ×0.7. This is because the lens displacement restricting pin 122 is pressed toward the lens position restricting plate 123 by the leaf spring 126. When the operator is operating the magnification converting lever 78 in the left direction, the lever 78 clicks at the position of ×1 and ×0.8. The lens assembly 30 can be displaced at the position by handing off the lever 78 at a desired magnification position, i.e., the position where the magnification converting lever clicks. At this point, since the lens displacement restricting pin 122 engages a recess corresponding to a magnification set by the operator, the detection switch 124 mounted in the recess is turned on. If the switch 124 is not turned on, it indicates that the lens assembly 30 is not placed at a predetermined position, in which case the control unit makes an error indication by means of the indicator 75, whereby the operator finds that the magnification converting lever 78 is not placed at an appropriate position.

Construction of lens position restricting plate

In the lens unit displacing mechanism as described so far, the recesses with which the lens displacement restricting pin 122 engage are formed at the right and left sides of the lens position restricting plate 123. The recesses formed at the left side correspond to paper sheets in AB the or centimeter system such as size A4, B5 and the like. The recesses formed at the right side correspond to paper sheets in the inch system. When the copying machine 1 is required to copy the image of original documents in the centimeter system, the lens position restricting plate 123 is mounted on the copying machine 1 so that the lens displacement restricting pin 122 is fitted in the recesses corresponding to original documents in the centimeter system. When the copying machine 1 is required to copy the image of original documents in the inch system, the lens position restricting plate 123 is mounted on the copying machine 1 so that the lens displacement restricting pin 122 is fitted in the recesses corresponding to original documents in the inch system. As such, no other members are necessary to be replaced. Therefore, the copying machine in such a construction is not likely to give rise to parts troubles. The switch 124 is mounted on the underside of the lens position restricting plate 123. When the copying machine 1 copies original documents in the inch system, the respective switches 124 are necessary to be mounted on recesses corresponding to sheets in the inch system.

Driving units such as a motor are not used in the lens unit displacement mechanism according to this embodiment. The lens assembly 30 is associated with the magnification converting lever 78 to be operated by an operator. The position of the lens assembly 30 can always be set predeterminedly by the lens position restricting plate 123 and the lens displacement restricting pin 122. Therefore, the copying machine can be manufactured at a low cost because a motor as well as a sensor, and a control member to control the position of the lens are not necessary to be equipped with the copying machine. Further, the copying machine is compact because a motor is not provided therewith.

5. Blank lamp unit

Figures 6A, 6B:
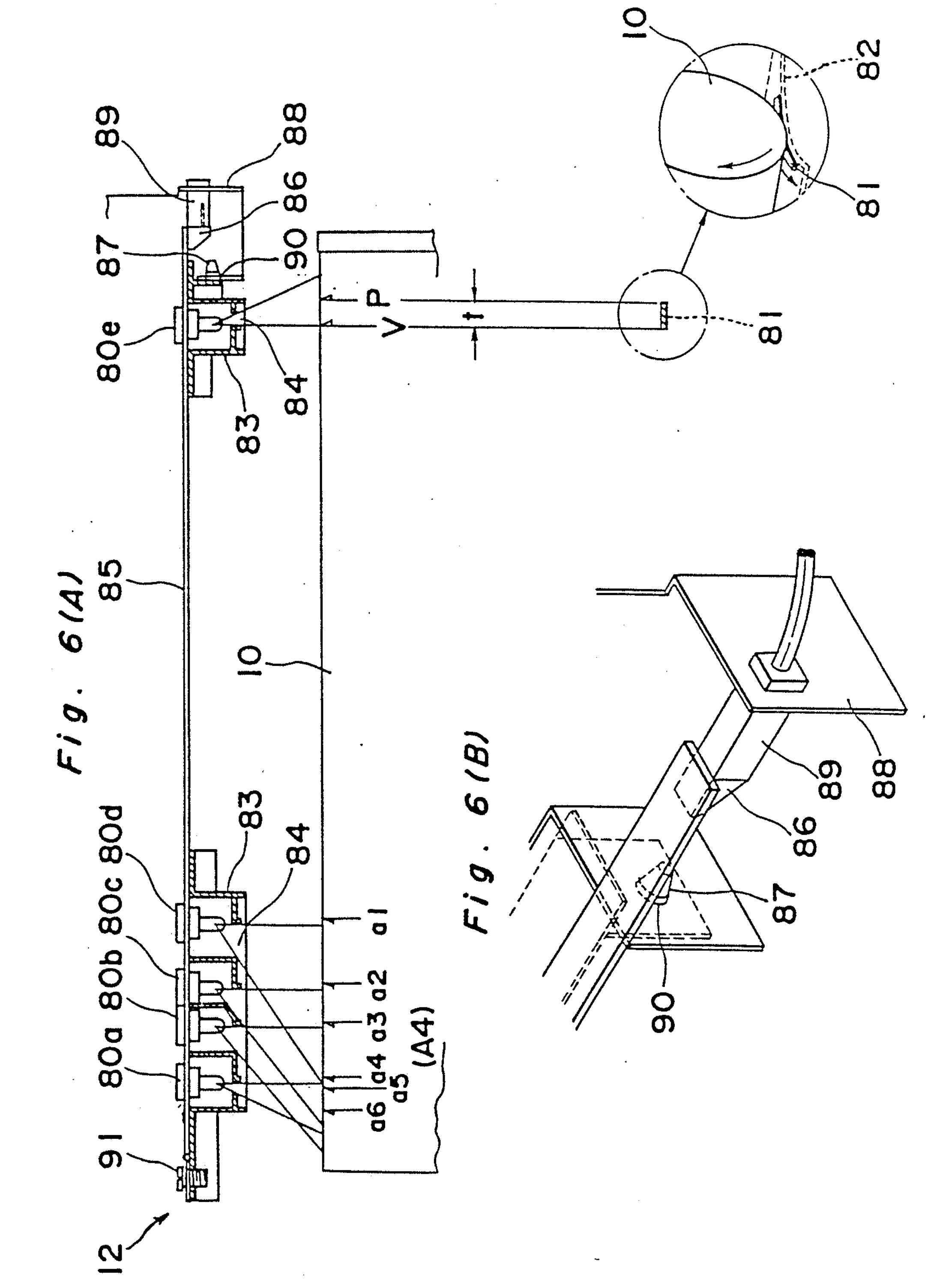
FIGS. 6(A) and 6(B) are a side sectional view and a fragmentary perspective view of a blank lamp unit employed in the copying machine of FIG. 1.

FIGS. 6(A) and 6(B) show the construction of the blank lamp unit. As shown in FIG. 2, the blank lamp unit 12 mounted on the lens unit 20 is positioned between the main charger 11 (charging unit) which uniformly charges the surface of the photosensitive drum 10 and the developing unit 13, and is disposed in the axial direction of the photosensitive drum 10. The blank lamp unit 12 is provided with five blank lamps **80*a*–80*e* which are independently turned on or off. Each of the blank lamps removes surplus electric charge which remains on the surface of the photosensitive drum 10**.

The blank lamps **80*a*–80*e* disposed at the left side in FIG. 6(A) remove surplus electric charge depending on the dimension of an image formed on the surface of the photosensitive drum 10. The blank lamp 80*e* disposed at the right side removes surplus electric charge which exists at the reference position of an image. The position shown by P in FIG. 2 indicates the reference position (edge of sheet) of an image. The position shown by V in FIG. 6(A) indicates an edge of a separation belt 81 disposed at the interval t between P and V. The separation belt 81 separates a paper sheet, to which a toner image has been transferred, from the photosensitive drum 10. As shown in FIG. 6(A), the separation belt 81 confronts an end of the lower portion of the photosensitive drum 10. A paper sheet 82 is placed on the separation belt 81 when the belt 81 is in the image transfer position. The separation belt 81 is interposed between the paper sheet and the photosensitive drum 10 at an end of the paper sheet 82, whereby the paper sheet to which an image has been transferred is forcibly and reliably separated from the surface of the photosensitive drum 10**. The separation belt in such a construction is known in the art.

The blank lamp **80*e* disposed at the right side of the blank lamp unit 12 removes electric charge in the region right from V, namely, an end of an image, whereby toner particles are prevented from adhering to the portion of the photosensitive drum 10 with which the separation belt 81 contacts; that is, toner particles do not adhere to the separation belt 81. Accordingly, the edges of the paper sheet 82** are prevented from being smudged by toner particles.

The blank lamp unit 12 is provided with a lamp box 83 in a predetermined configuration in order to restrict a region from which electric charge is removed by the respective blank lamps.

The lamp box 83 forms chambers which partition each of the blank lamps **80*a*–80*e*. The lamp box 83 is provided with openings 84 at the portion which confronts the photosensitive drum 10 so that the openings 84 allow light irradiated from the lamps to pass therethrough. The dimensions of the openings 84 provided with the chambers, respectively are so set that the openings 84 restrict the range of the lights irradiated from each of the lamps. For example, as shown in FIG. 6(A), the dimensions of the openings 84 provided within the chamber which houses the blank lamp 80***d* is so set that the range of the light to be irradiated from the lamp 80*d* is within the hatched region, namely, from a1 to a5 of the photosensitive drum 10. Likewise, the opening 84 of the chamber which houses the blank lamp 80*c* is so dimensioned that the light to be irradiated from the blank lamp 80*c* is in the region from a2 to a6. The opening 84 of the chamber which houses the blank lamp 80*b* is so dimensioned that the light to be irradiated from the blank lamp 80*b* is in the region from a3 to the location in the vicinity of the left end of the photosensitive drum 10. The dimension of the opening 84 of the chamber which houses the blank lamp 80*a* disposed at the left end of the blank lamp unit 12 is so set that the light to be irradiated from the lamp 80*a* is in the region from a5 to the location in the vicinity of the left end of the photosensitive drum 10.

The positions a1 to a6 indicate the left end portion of an image depending on the size of an original document and a magnification set by an operator. Accordingly, when the position of the left end of an image to be formed is at a1, all of the blank lamps 80*a*–80*d* are turned on and the electric charge in the region from the position a1 to the left end of the photosensitive drum 10 is all removed. When the position of the left end of an image to be formed is at the position a3, the blank lamps 80*a* and 80*b* are turned on and the blank lamps 80*c* and 80*d* are turned off. The position shown by a5 corresponds to the left end position of an image to be formed on a paper sheet in size A4.

The dimension of the opening 84 of the lamp box 83 which houses the blank lamp 80*e* is so set that the electric charge, which exists on the photosensitive region where the separation belt 81 confronts, is removed. Specifically, the dimension of the opening 84 is set so that the left end of a light irradiated from the blank lamp 80*e* corresponds to the left end V of the separation belt 81 as shown in FIG. 6(A) and that the region from the position V to the end of the photosensitive drum 10 is irradiated.

The blank lamps 80*a*–80*e* and the lamp box 83 are mounted on a blank lamp supporting plate 85 mounted on a frame so that the plate 85 is parallel to the axis of the photosensitive drum 10. A connector 86 to supply power source with the blank lamps is mounted on the right end of the blank lamp supporting plate 85. One end of an engaging projection for placing the blank lamp unit in position 87 (hereinafter referred to as engaging projection 87) which projects toward the right is mounted on the left side of the connector 86. Mounted on a frame 88 are a connector 89 connected to the connector 86 and an engaging opening 90 with which the engaging projection 87 engages. The end of the blank lamp unit 12 is placed in position by fitting the engaging projection 87 in the engaging opening 90. When this fit-in operation is carried out, the connector 86 is connected to the connector 89, for the copying machine 1, which supplies power source to the blank lamps.

FIG. 6(B) shows an external appearance of the engaging projection 87 and the members situated in the vicinity of the fit-in opening 90 in which the engaging projection 87 is fitted.

The end of the blank lamp supporting plate 85 is fixed to the frame as described above. Therefore, the other end of the blank lamp supporting plate 85 is fixed to the frame by a screw 91.

If a small amount of a toner adheres to the separation belt 81, the toner image is developed on a paper sheet. Therefore, the opening of the lamp box 83 to restrict the range of the light to be irradiated from the blank lamp 80*e* is required to be accurately placed in position. The blank lamp unit 12 is placed in position so that the left end of the light, irradiated from the blank lamp 80*e* which passes through the opening 84, coincides with the position V of the photosensitive drum 10. If the right end of the blank lamp unit 12 is fixed to the plate 85 after the left end of the blank lamp unit 12 is placed in position, the position of the opening 84 from which a light is irradiated from the blank lamp 80*e* is not appropriately placed in position because the distance between the left end of the blank lamp unit 12 and the position V is long. According to this embodiment, since the right end of the blank lamp unit 12 is mounted on the blank lamp supporting plate 85 before the left end thereof is mounted on the unit 12, the opening 84, from which a light is irradiated from the blank lamp 80*e*, is placed in position.

According to this embodiment, the placing of the blank lamp unit 12 in position is carried out by fitting the engaging projection 87 mounted on the portion which confronts the separation belt 81 in the fit-in opening 90 of the frame 88, and then, the other end of the blank lamp unit 12 is fixed to the plate 85 by a screw. Accordingly, the opening 84 from which a light is irradiated from the blank lamp 80*e* is correctly placed in position.

In this embodiment, the engaging projection 87 is mounted on the position where the blank lamp unit 12 is mounted and the fit-in opening 90 is mounted on the frame. However, this operation is also performed as well by reversing the positions of the two members.

6. Construction for cleaning optical system

Figure 7:
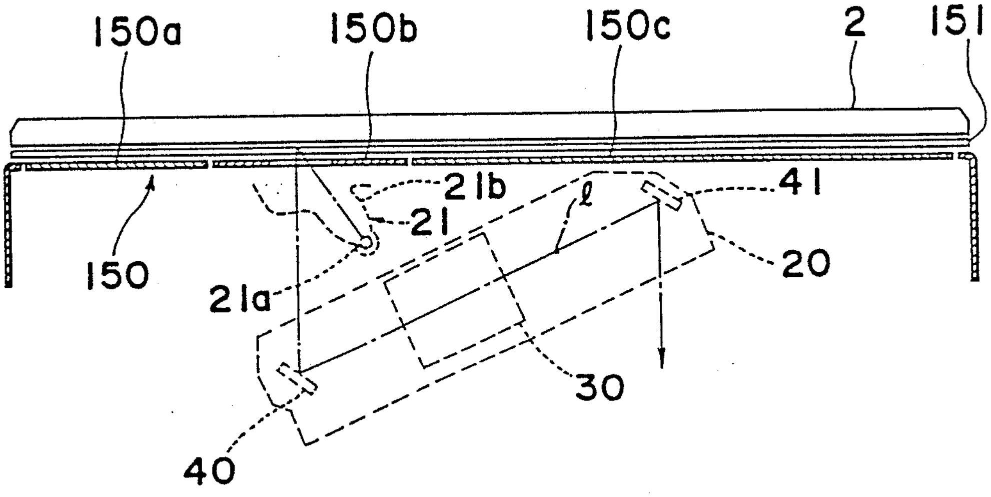
FIG. 7 is a fragmentary side sectional view showing construction of an upper plate of the copying machine of FIG. 1.
Figure 8:
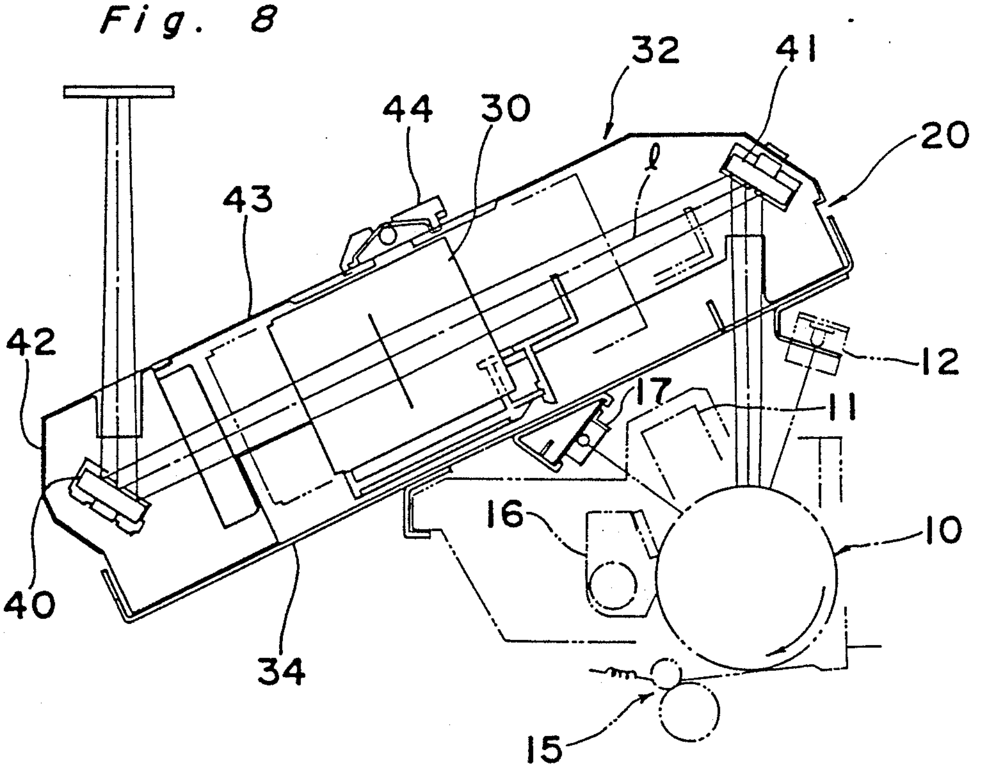
FIG. 8 is a schematic side sectional view showing construction of the lens unit.

FIGS. 7 through 9 show the construction for cleaning the optical system according to this embodiment.

In an electrophotographic copying machine according to this embodiment, the portion which confronts the light source unit mounted on the upper plate of the electrophotographic copying machine is detachably mounted. Further, the lens unit which confronts the above-described portion is also detachably mounted.

FIG. 7 is a view showing the construction of the upper plate of the copying machine according to this embodiment. The upper plate 150 of the copying machine comprises three plates 150*a*, 150*b*, and 150*c* capable of being detached. These plates are mounted by screws and are easily detached by removing the screws. The plate 150 of the copying machine is detached therefrom by opening an original document cover 2 and detaching the original document platform independently.

Of the covers 150*a* to 150*c* composing the upper plate 150 of the copying machine, the cover 150*b* disposed in the middle of the three covers is positioned directly above the light source unit 21. The left upper portion of the lens unit 20 confronts the cover 150*b*. As described later, covers capable of being opened and closed are provided on the left and right upper portions of the lens unit 20.

According to the above-described construction, by detaching each of the original document placing plates after opening the original document cover 2, and detaching the cover **150*b* positioned in the middle of the three plates 150, a reflector 21*b* and the light source 21*a* can be easily cleaned because the light source unit 21 is disposed directly below the cover 150*b***. Further, the light source unit may be detached.

FIG. 8 shows the construction of the lens unit.

The lens unit 20 includes, as described above, the lens assembly 30 and two reflecting mirrors 40, 41 housed in the lens unit main body 32. The lens unit main body 32 comprises a side plate 35, a lens unit cover 43 covering the upper portion of the side plate 35, and the lens unit base 34 disposed at the bottom of the side plate 35.

Formed on the side plate 42 is a hook 44 which hooks the lens unit cover 43, whose detailed construction is described later.

Figure 9A:
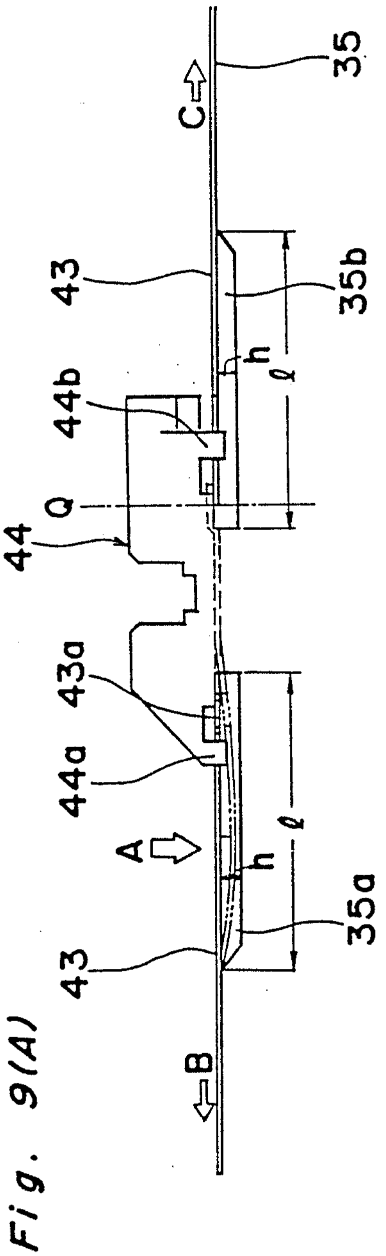
FIGS. 9(A) and 9(B) are fragmentary side elevational view and top plan view at essential portions of the lens unit for explaining construction of the lens unit cover open/close mechanism.
Figure 9B:
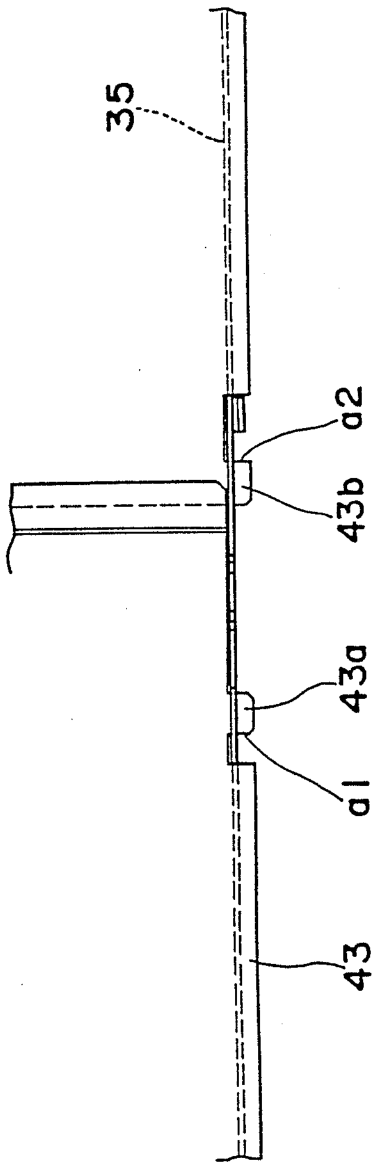

FIGS. 9(A) and 9(B) show the opening and closing mechanism of the lens unit cover 43. FIG. 9(A) is a front view of principal portions of the lens unit cover 43. FIG. 9(B) is a plan view of principal portions of the lens unit cover 43.

Hooking projections **44*a* and 44*b* are formed at the front and rear of the hook 44 which projects upwards from the side plate of the lens unit main body 32. As shown in FIG. 9(B), the lens unit cover 43 has projections 43*a* and 43*b* projecting upwards from the drawing and in the axial direction of the photosensitive drum 10. The hooking projection 44*a* engages the left end a1 of the projection 43*a* of the lens unit cover 43. The hooking projection 44*b* engages the right end a2 of the projection of 43*b* disposed at the right of the lens unit cover 43. The lens unit cover 43 comprises two portions, namely, the left and right portions. The ends of the left and right portions overlap with each other at the point Q. Cut-outs 35*a* and 35*b* are formed at both sides of the hook 44. The lengths of the cut-outs 35*a* and 35*b* are much longer than that of the hooking projections 44*a* and 44*b*. The height h thereof is so set that the lowermost portions of the hooking projections 44*a* and 44*b* do not contact with those of the cut-outs 35*a* and 35*b***.

The description which is made hereinafter relates to the opening and closing operations of the lens unit cover.

In a normal condition, the hooking projections **44*a* and 44*b* of the side plate 35 engage with the ends a1 and a2 of the projections 43*a* and 43*b* formed on the lens unit cover 43. Caused by this, the lens unit cover 43 cannot be moved in the directions A and B shown by the arrow. However, the portion which confronts the cut-out 35*a* formed on the side plate 35 is bent, as shown by the two-dot chain line, by applying pressure thereto in the direction A as shown by the arrow. The projection 43*a* disengages from the hooking projection 44*a* when pressure is applied to the portion which confronts the cut-out 35*a* to such an extent that the hooking projection 44*a* is disengaged. As a result, the lens unit cover 43 disposed at the left in FIG. 9(A) is capable of moving in the direction B shown by the arrow, i.e., the force to move the lens unit cover 43 is only the force applied to the portion confronting the cut-out 35*a*. This allows the lens unit cover 43 disposed at the left of the lens unit main body 32 to be opened. In the same manner, the lens unit cover 43** disposed at the right can be opened in the direction C shown by the arrow.

As shown in FIG. 7, the light source unit 21 is disposed at the upper left of the lens unit 20. The cover **150*b* which composes the upper plate of the copying machine 1 is detachable. According to this arrangement, force may be applied downwards to the lens unit 20 in the direction A shown by the arrow in FIG. 9(A) after the cover 150*b* and the light source unit 21 are removed from the copying machine 1. In this manner, the light source unit 21 can be cleaned. Further, members mounted inside the lens unit 21 can be cleaned. The removal of the cover disposed at the left suffices to clean the lens unit cover. The lens unit cover can be cleaned perfectly by detaching the cover 150*c* disposed at the right and by opening the lens unit cover 43 in the direction C shown by the arrow illustrated in FIG. 9. In this case, the right side of the lens unit cover 43** can be favorably cleaned.

According to this embodiment, the light source unit 21 can be easily cleaned because the portion which confronts the light source unit 21 disposed on the upper plate of the copying machine 1 is detachably mounted thereon. Further, the lens unit cover 43 disposed at the left of the lens unit 20 can be opened by removing the light source unit 21. Thus, the members including the lenses mounted inside the lens unit 20 can be easily cleaned. Further, according to this embodiment, the upper plate on the copying machine 1 is detachably mounted thereon and the lens unit cover 43 disposed at the right can be opened and closed. Therefore, the members mounted in the lens unit 20 (especially the members disposed at the right side) can be cleaned very easily by removing the cover **150*c*** and opening the lens unit cover disposed at the right.

7. Exhaust construction

In the electrophotographic copying machine according to this embodiment, ozone formed in the periphery of a photosensitive drum, air which contains a developer, and heat are exhausted from the copying machine by an exhaust fan through a lens unit.

Figure 10:
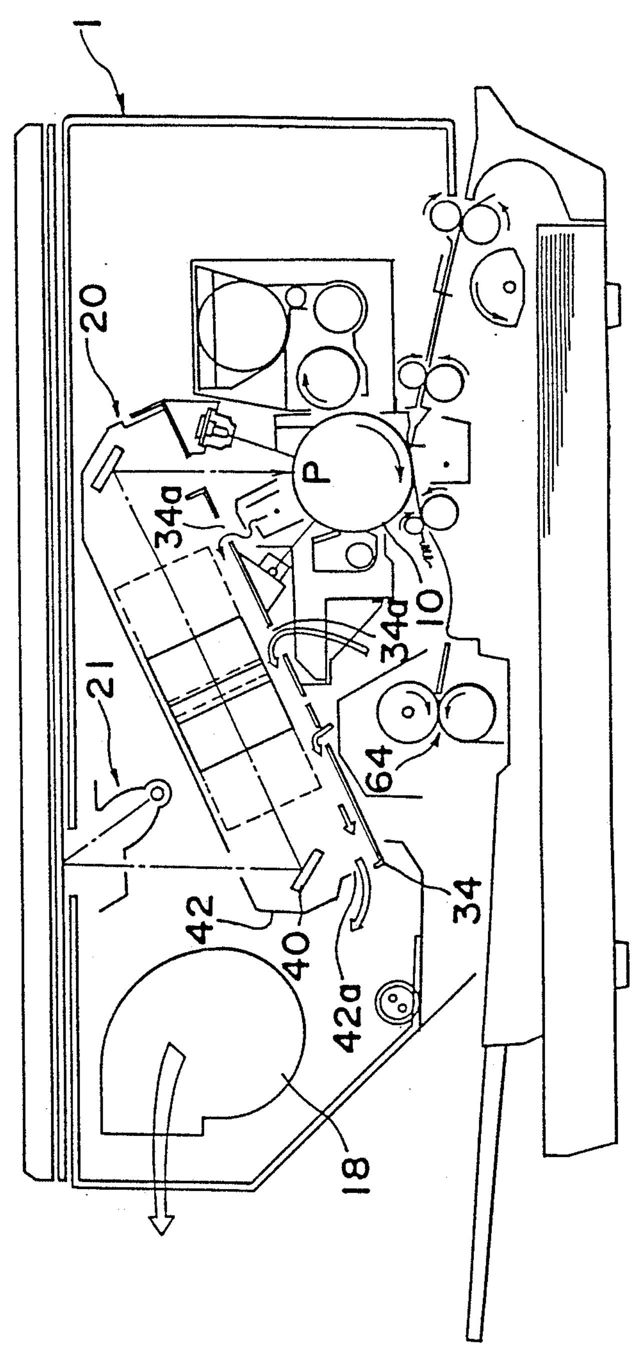
FIG. 10 is a view similar to FIG. 2 for explaining an exhaust construction of the copying machine of FIG. 1.

FIG. 10 shows how ozone formed in the periphery of the photosensitive drum 10, air containing a developer, and the heat generated from the fixing rollers 64 are exhausted from the copying machine 1.

Figure 11:
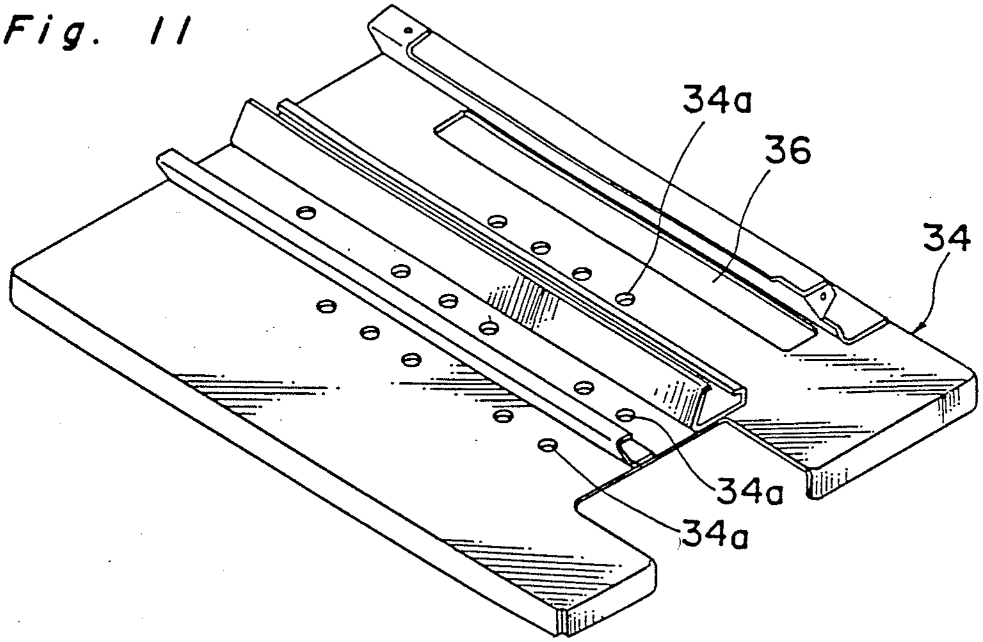
FIG. 11 is a perspective view showing a mirror unit base as observed from the bottom portion.

A plurality of suction openings **34*a* (air flow openings) are formed in the lens unit base 34 which composes the base plate of the lens unit 20. An exhaust opening 43*a* is formed at the portion positioned below the first reflecting mirror 40 provided with the side plate 35. FIG. 11 is a view taken from the underface of the mirror unit base 34. Numeral 36 denotes a slit to irradiate light, reflected from a second reflection mirror 41, to the exposure point P illustrated in FIG. 2**.

As described hereinabove, a plurality of the suction openings **34*a* are provided on the lens unit base 43 and the exhaust opening 42*a* is provided at the portion below the first reflection mirror 40 mounted on the side plate 35. Accordingly, ozone formed in the periphery of the photosensitive drum 10, ozone formed by the main charger 11, air containing a developer which has scattered in the periphery of the photosensitive drum 10, and heat generated from the fixing roller 64 is introduced from the suction opening 34*a* into the lens unit 20. It is all then delivered to the exhaust opening 42*a* along the lens unit base 34, and thereafter, exhausted from the lens unit 20 through the exhaust opening 42*a*. The air thus exhausted from the lens unit 20 is exhausted from the copying machine 1 by means of the air exhaust fan 18**.

Such an air exhaust construction allows the interior of the lens unit 20 to be efficiently used as an air exhaust passage. Further, air does not flow upwards, but flows along the lens unit base 34, and then, is exhausted outside from the air exhaust opening 42*a* because the air exhaust opening 42*a* which draws air into the lens unit 20 is disposed below the first reflection mirror 40. This prevents the reflection mirror 40, 41 and lens 30 from being smudged by the air which has been introduced into the lens unit 20.

8. Lens position warning display control (FIG. 12)

As described above, in the electrophotographic copying machine according to the embodiment, the position control of the lens assembly 30 is not carried out by a motor, but by the mechanism which is interlocked with the magnification converting lever 78. In order to place the lens assembly 30 at a predetermined position when the magnification converting lever 78 is operated, the lens position restricting plate 123 as well as the recesses 127 which are mounted on the edge of the lens position restricting plate 123 and which correspond to the respective magnifications are mounted on the copying machine 1. As described above, the lens assembly 30 is positioned predeterminedly when the lens displacement restricting pin 122 mounted on the lens holder 108 is fitted in the recess 127 which corresponds to a selected magnification. The problem with this mechanism is that if the magnification converting lever 78 is not correctly positioned, the lens displacement restricting pin 122 is not appropriately fitted in the recess 127 mounted on the lens position restricting plate 123. In this case, an image formation cannot be accomplished favorably.

According to the embodiment of the present invention, as described previously, the detection switches 124 are mounted on recesses 127 provided with the lens position restricting plate 123. When the lens displacement restricting pin 122 fits in the recess 127 appropriately, the switch 124 mounted on the recess 127 is turned on.

Figure 12:
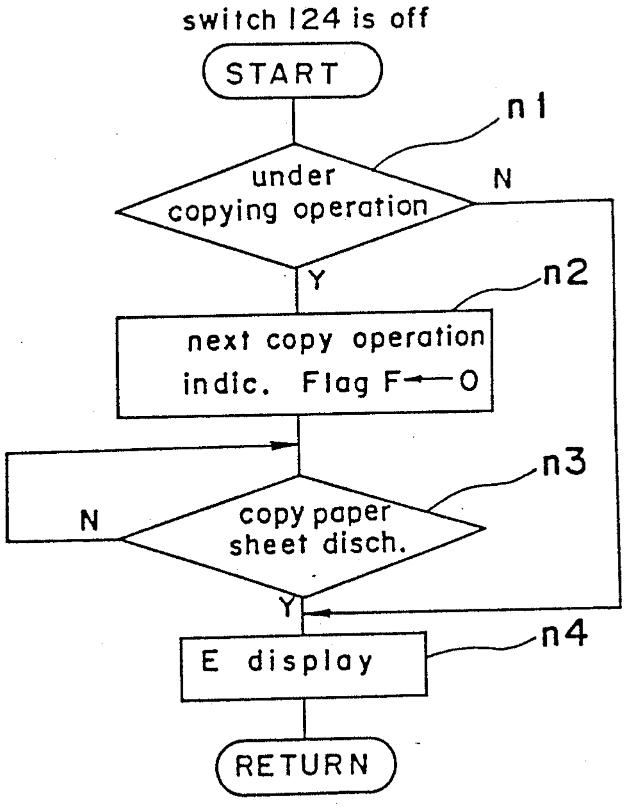
FIG. 12 is a flow-chart for explaining functioning of the control section when the lens position is not correct.

FIG. 12 is a flow chart showing how a microcomputer works when the detection switch 124 is not turned on by the operation of the magnification converting lever 78. The microcomputer is used in the control unit of the electrophotographic copying machine according to the embodiment. Signals outputted from switches and sensors are inputted in the microcomputer.

In FIG. 12, if none of the detection switches are turned on by the operation of the magnification converting lever 78, it is detected, at step n1, whether or not a copying operation is being carried out. If it is detected that a copy operation is not being made, the program advances to step n4 and an error indication (lamp E lights) is made by the indicator 75 (refer to FIG. 3). If it is detected that a copy operation is being made, the program advances from step n1 to n2, where a flag F, which indicates the following copy operation is possible, is reset. At step n3, when a copied paper sheet is discharged from the copying machine 1, the program advances to step n4 where an error indication is made. When the error indication is made at step n4, the operator finds at this moment that the magnification converting lever 78 has not been positioned appropriately.

An operator easily finds whether or not the lens assembly 30 is positioned appropriately according to the above-described operation. Therefore, the operator can use the copying machine reliably and no erroneous copy is made.

As is clear from the foregoing description, particularly in the function and the embodiment for the lens unit, according to the present invention, by operating the magnification converting lever provided on the control panel, the lens holder slides over the sliding shaft by the amount corresponding to the amount of operation. Therefore, if it is so arranged that the set position of the switch is preliminarily displayed on the control panel so that the operating amount of the magnification converting lever becomes the amount corresponding to a plurality of paper sizes, with the configurations of the magnification changeover arm, sliding shaft and lens holder being formed in such a manner that the lens position is set at the position of magnification corresponding to the switch set position when the magnification converting lever is at the set position, the operator can set the lens at the correct position corresponding to its magnification by only bringing the magnification converting lever to the position of the displayed magnification.

Accordingly, not only the motor for displacing the lens and sensors for detecting the amount of displacement thereof become unnecessary, but the copying apparatus on the whole may be made compact in size owing to elimination of the motor which occupies a comparatively large space, with a simultaneous reduction in cost.

Moreover, according to the arrangement of the present invention, since the operator can feel the click during the operation of the magnification converting lever when the lens displacement restricting pin is fitted into the recess of the lens position restricting plate, if the position is set to be a position corresponding to the copy paper size, the lens may be set at the correct position even without use of sensors and the like. Owing to the fact that the recesses are formed at the opposite sides of the lens position restricting plate, with the recess at one side being formed at the position different from that at the other side, if, for example, the recess at the one side is set to correspond to the copy paper sheet of the AB system, with the recess at the other side adapted to correspond to the copy paper sheet of the inch system, either kind of the copy paper sheet may be dealt with by merely changing the direction of mounting of the lens position restricting plate.

Furthermore, according to the present invention, since the switch means is provided in the recess of the lens position restricting plate, said switch means is not actuated unless the lens displacement restricting pin provided on the lens holder is fitted into the recess, and the warning is given when said switch means is not actuated. On the other hand, when the lens displacement restricting pin is correctly fitted into the recess, the above switch means is actuated. Since the warning is not given if the switch means is actuated, while it is given when the switch means is not actuated, the operator can find that the lens is set at the correct position if no warning is given during operation of the magnification converting lever, and that the lens is deviated from the correct position if the warning is emitted. In the latter case, it is meant that the magnification converting lever is deviated from the correct position, and therefore, the operator is only required to operate the magnification converting lever back to the predetermined position again, whereby it is possible to positively set the lens at the correct position.

As described above, in the present invention, even if the magnification converting lever should not be set at the correct position, the warning is given to the operator, who is able to find that the lens position is incorrect immediately, and thus, starting of the copying operation with the lens set in the incorrect position may be advantageously prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A magnification converting mechanism for a variable magnification copying apparatus which comprises a magnification converting operating mechanism provided on a control panel, an operating force transmission mechanism associated with functioning of said magnification converting operating mechanism, a lens holding member engaged with said operating force transmission mechanism so as to be displaced along a guide member, and a lens assembly held on said lens holding member.

2. A magnification converting mechanism as claimed in claim 1, wherein said guide member of said lens holding member is arranged to be slidably fitted on a sliding shaft and engaged with part of a magnification change-over arm so as to be slid over said sliding shaft following displacement of said arm.

3. A magnification converting mechanism for a variable magnification copying apparatus which comprises a magnification converting operating mechanism provided on a control panel, an operating force transmission mechanism associated with functioning of said magnification converting operating mechanism, a lens holding member engaged with said operating force transmission mechanism so as to be displaced along a guide member, and a lens assembly held on said lens holding member, a lens displacement restricting means provided on said lens holding member, and a lens position restricting member provided side by side with said guide member for stopping said lens displacement restricting means when said lens holding member is in a predetermined position;

the stopping portion of said lens position restricting member being formed on said restricting member in a plurality of groups, with the position of one group and that of the other group being different along the direction of displacement of said lens holding member, said restricting member being so mounted that any of the stopping portion group of the plurality of groups of said stopping portions can confront said lens displacement restricting means.

4. A magnification converting mechanism as claimed in claim 3, wherein said guide member of said lens holding member is arranged to be slidably fitted on a sliding shaft and engaged with part of a magnification change-over arm so as to be slid over said sliding shaft following displacement of said arm.

5. In a magnification converting mechanism for a variable magnification copying apparatus which comprises a magnification converting operating mechanism provided on a control panel, an operating force transmission mechanism associated with functioning of said magnification converting operating mechanism converting operating mechanism, a lens holding member engaged with said operating force transmission mechanism so as to be displaced along a guide member and a lens assembly held on said lens holding member, a lens displacement restricting means provided on said lens holding member, and a lens position restricting member provided side by side with said guide member for stopping said lens displacement restricting means when said lens holding member is in a predetermined position;

the improvement comprising a detecting means provided in said stopping portion for detecting that said displacement restricting means has fitted in said stopping portion.

6. A magnification converting mechanism as claimed in claim 5, further including means for giving warning when said detecting means is not functioning.

7. A magnification converting mechanism as claimed in claim 5, wherein said guide member of said lens holding member is arranged to be slidably fitted on a sliding shaft and engaged with part of a magnification change-over arm so as to be slid over said sliding shaft following displacement of said arm.

* * * * *